US012447511B2

(12) United States Patent
Polignone

(10) Patent No.: US 12,447,511 B2
(45) Date of Patent: Oct. 21, 2025

(54) CLEANING AND SANITIZING IN THE MEAT PACKING INDUSTRY

(71) Applicant: NuGeneration Technologies, LLC, Emeryville, CA (US)

(72) Inventor: Donato Polignone, Emeryville, CA (US)

(73) Assignee: NuGeneration Technologies, LLC, Emeryville, CA (US)

( * ) Notice: Subject to any disclaimer, the term of this patent is extended or adjusted under 35 U.S.C. 154(b) by 0 days.

(21) Appl. No.: 17/822,406

(22) Filed: Aug. 25, 2022

(65) Prior Publication Data

US 2023/0069489 A1 Mar. 2, 2023

Related U.S. Application Data

(60) Provisional application No. 63/260,674, filed on Aug. 27, 2021.

(51) Int. Cl.
| | | |
|---|---|---|
| *B08B 3/04* | (2006.01) | |
| *A22C 18/00* | (2006.01) | |
| *B08B 3/02* | (2006.01) | |
| *B08B 3/08* | (2006.01) | |
| *B08B 3/10* | (2006.01) | |

(52) U.S. Cl.
CPC ............. *B08B 3/08* (2013.01); *A22C 18/00* (2013.01); *B08B 3/022* (2013.01); *B08B 3/041* (2013.01); *B08B 3/102* (2013.01)

(58) Field of Classification Search
None
See application file for complete search history.

(56) References Cited

U.S. PATENT DOCUMENTS

| 2008/0023044 A1* | 1/2008 | Hubrig ................. C11D 10/045 510/420 |
| 2014/0259479 A1* | 9/2014 | Sheirs ..................... A63D 5/10 15/98 |

(Continued)

FOREIGN PATENT DOCUMENTS

| AU | 2002230583 | * 10/2005 |
| CN | 108624872 | * 10/2018 |
| EP | 0398123 | * 11/1990 |

(Continued)

OTHER PUBLICATIONS

Translation of WO2017090797 by Kim, published Jun. 1, 2017.*

(Continued)

*Primary Examiner* — Kaj K Olsen
*Assistant Examiner* — Ryan L Coleman
(74) *Attorney, Agent, or Firm* — Brian M. Kaufman; Robert D. Atkins; PATENT LAW GROUP: Atkins and Associates, P.C.

(57) ABSTRACT

A cleaning system for a meat-packing plant includes a tank with a potassium-based cleaner disposed in the tank. A track has a gambrel disposed on the track. The track includes a dip over the tank to dip the gambrel into the potassium-based cleaner as the gambrel moves along the track. A processed animal carcass is removed from the gambrel prior to the gambrel being dipped into the potassium-based cleaner. A fresh animal carcass is disposed on the gambrel after the gambrel is dipped into the potassium-based cleaner.

6 Claims, 7 Drawing Sheets

(56) References Cited

U.S. PATENT DOCUMENTS

2018/0141094 A1\* 5/2018 Hays .................... B03C 1/30
2020/0390115 A1\* 12/2020 McAninch ............ B05B 5/0255

FOREIGN PATENT DOCUMENTS

| GB | 1570874 | \* | 7/1980 |
| WO | WO9702753 | \* | 1/1997 |
| WO | WO2017006114 | \* | 1/2017 |
| WO | WO2017090797 | \* | 6/2017 |

OTHER PUBLICATIONS

Translation of EP0398123 by Hoecker, published Nov. 22, 1990.\*
Merriam-Webster Dictionary definition of "all-purpose".\*
Merriam-Webster Dictionary definition of "caustic".\*
Translation of CN108624872 by Liu, published Oct. 9, 2018.\*
Merriam-Webster dictionary definition of "tendency".\*

\* cited by examiner

CLEANING AND SANITIZING IN THE MEAT PACKING INDUSTRY

CLAIM OF DOMESTIC PRIORITY

The present application claims the benefit of U.S. Provisional Application No. 63/260,674, filed Aug. 27, 2021, which application is incorporated herein by reference.

FIELD OF THE INVENTION

The present invention relates in general to cleaning and sanitizing, and, more particularly, to a system and method of cleaning hooks, trollies, knives, machine parts, and other miscellaneous surfaces and equipment for the food and meat industry.

BACKGROUND OF THE INVENTION

Meat packing and other food processing plants typically have many parts that need to be kept clean and sanitary. Animals are hung from hooks on conveyer belt tracks that carry the animal through processing. The hooks need to be cleaned between animals. Workers use knives to process animals by hand, and the knives need to be cleaned between animals.

Currently, most cleaning is being done in a caustic soda bath kept at 180-degrees Fahrenheit using hot water and steam. After the caustic bath, the item being cleaned is rinsed thoroughly using water, and then dipped into an oil bath. The current system is an overly complicated three-step process that wastes a lot of water and energy.

The current system is also not sanitary. The oil dip in the final step is floated on a bed of water. The water gets dirty and starts to grow bacteria. The bacteria eats the oil and generates hydrogen sulfide, creating a rotten egg smell. The item being cleaned ends up with a coating of the gross oil before the next animal is processed.

The current cleaning process in meat processing plants is very wasteful and not very effective. Accordingly, a need exists for an improved sanitization system and method for metal surfaces in meat and other food processing plants.

DETAILED DESCRIPTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention.

Figure 1:
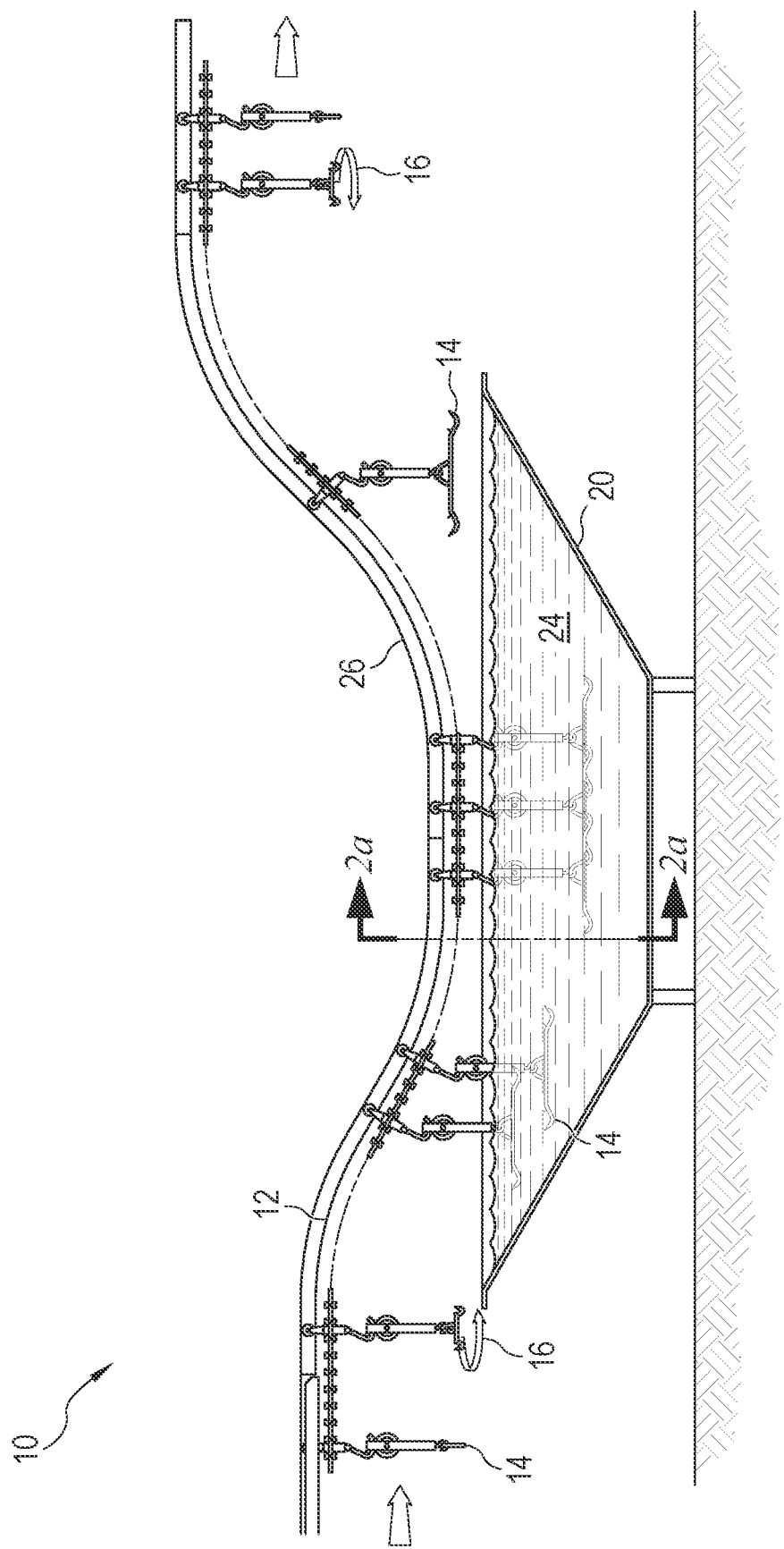
FIG. 1 illustrates a cleaning tank for a gambrel trolley system.

FIG. 1 illustrates a trolley system 10 for a meat processing plant. Trolley system 10 includes a conveyer belt or track 12 that guides a plurality of gambrels 14 through the factory. Gambrels 14 have hooks or other elements to hang an animal carcass from. The animal carcass is processed in an assembly line where track 12 guides the gambrels in front of a series of factory employees or machines that do the processing. When an animal is fully processed, the processed animal carcass is removed from its respective gambrel 14 and the gambrel is cleaned before another animal is hung from it.

FIG. 1 illustrates a cleaning tank 20 that is used to clean gambrels 14 between animals being processed on the gambrel. Gambrels 14 enter from the left in FIG. 1 after a processed animal has been removed and the gambrel remains soiled from the animal. Soiled gambrels 14 will have blood, guts, skin, bone, oil, and other substances from the animal remaining on the gambrel that should be removed to ensure sanitary conditions.

Track 12 includes a dip 26 where the track is lower than the surrounding area. Dip 26 results in gambrels 14 being lowered down into tank 20 as the gambrels move along track 12. Tank 20 has sloped sides on the ends parallel to track 12 so that the sides slope down in a similar manner to the track sloping into dip 26. Sloped sides of tank 20 reduces the volume of the tank that must be filled with liquid by eliminating the tank volume where gambrels will never travel.

Tank 20 contains a cleaning solution 24. While the prior art uses a problematic solution including caustic soda and bleach mixed with water, cleaning solution 24 uses a more traditional cleaner, such as an all-purpose cleaner. In one embodiment, AquaKlean H4H is used. AquaKlean H4H is described in Appendix A of the provisional application, which is included herein by reference. AquaKlean H4H is a low foaming, multi-metal cleaner. AquaKlean H4H remains clear both in concentrate and in dilution during use, with no foaming tendencies at both high and low temperatures, allowing for efficient and robust cleaning and residue free spotless rinsing. Other all-purpose cleaners or metal cleaners approved for indirect food contact are usable in other embodiments.

Using a potassium-based cleaner provides additional benefits in wastewater treatment compared to the prior art caustic soda method. One of the common uses for cleaning solution 24 after being used in cleaning tank 20 is as water for crops and other plants. However, because sodium kills plants, the prior art requires that the sodium from bleach and caustic soda must be removed using an expensive process prior to using the wastewater for watering plants. However, potassium is a fertilizer, so potassium-based cleaners such as the AquaKlean H4H used in cleaning solution 24 does not need to be processed nearly as much before being used as water for crops. Cleaning solution 24 with AquaKlean H4H instead of caustic soda can also be used at room temperature in tank 20 rather than having to be heated to 180 degrees Fahrenheit as in the prior art, thus saving significantly on energy costs.

A 1% by volume concentration of AquaKlean H4H to water is used for cleaning solution 24, but other concentrations are used as desired, e.g., between 1-10% by volume. In one embodiment, AquaKlean H4H concentrate has a pH between 10.0 and 10.2, and at 5% concentration by volume has a pH of between 9.8 and 10.0. Cleaning solution 24 can also include an optional lubricant to help keep gambrels 14 lubricated. The lubricant used in cleaning solution 24 should be water-soluble, e.g., a polyethylene glycol or polypropylene glycol.

Simply dipping gambrels 14 into tank 20 with cleaning solution 24 may satisfactorily clean the gambrels while saving on water usage and energy costs. However, adding some agitation or turbulence to knock particles off gambrels 14 will increase the cleaning effectiveness of tank 20 without significantly increasing operating costs.

Figure 2A:
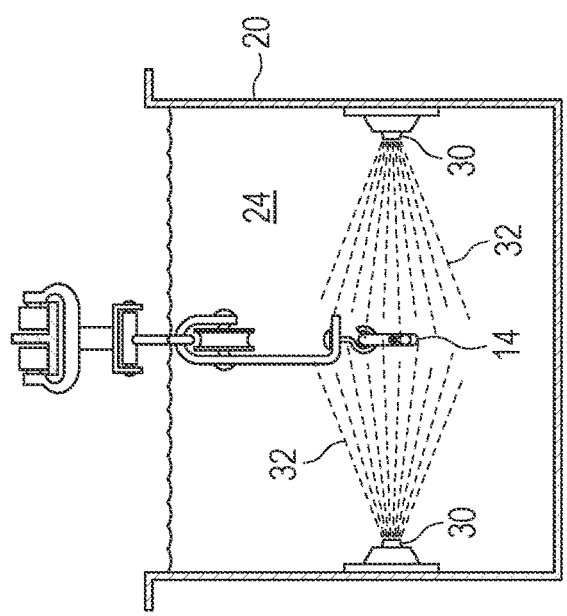
FIGS. 2a-2c illustrate optional agitation systems for the cleaning tank.
Figure 2B:
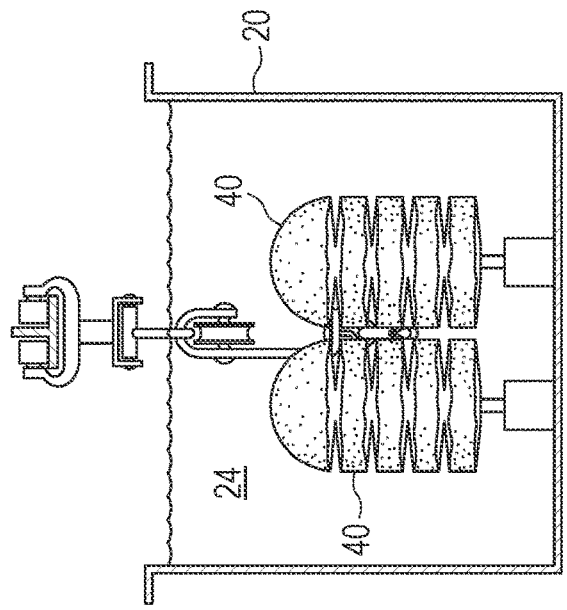
Figure 2C:
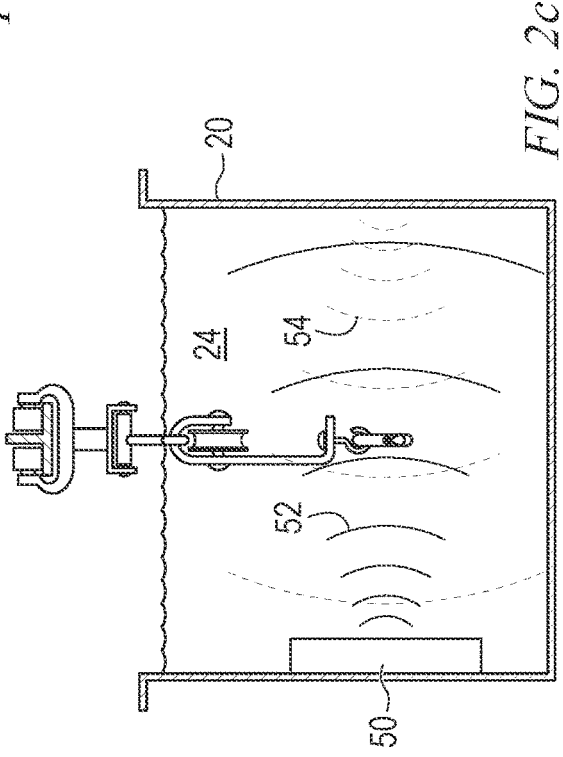

FIGS. 2a-2c illustrate cross-sections of tank 20 from FIG. 1 with options for adding agitation or turbulence. Gambrels 14 can optionally be turned when entering and exiting tank 20 as indicated by arrows 16 in FIG. 1. Turning gambrels 14 so that the gambrels are oriented in parallel with track 12 helps the agitation means, which are commonly positioned at the sides of tank 20, to have a larger attack surface of the gambrels.

In FIG. 2a, jets 30 are installed on the sides of tank 20. Jets 30 create flows 32 of cleaning solution 24 across gambrels 14. Air bubbles can optionally be injected along with the flow 32 of cleaning solution 24 to increase agitation. Jets 30 blow off pieces of organic matter stuck to gambrels 14 and also supply fresh cleaning fluid 24 to ensure the chemistry of the fluid that is touching the gambrels continues to work. Jets 30 can be staggered along the length of tank 20 and also varied in height to provide a variety of attack angles for water jets 32.

FIG. 2b shows brushes 40 disposed in tank 20. Brushes 40 physically contact gambrels 14 as the gambrels move past the brushes within tank 20. Brushes 40 can spin as well as moving vertically and horizontally to create physical motion of the brushes against gambrels 14, thus knocking off meat, fat, and other particles stuck to the gambrels after a processed animal is removed. In some embodiments, brushes 40 remain static and gambrels 14 are pulled through the brushes. Brushes 40 include a central shaft with bristles comprised of plastic, fabric, foam, or other suitable materials for cleaning metal surfaces.

FIG. 2c shows an ultrasonic emitter 50 disposed in tank 20. Ultrasonic emitter 50 creates ultrasonic sound waves 52 that hit gambrels 14 and knock leftover particles off of the gambrels. Ultrasonic sound waves 52 can echo off the opposing surface of tank 50 to create echoed sound waves 54 that further help clean gambrels 14. In other embodiments, ultrasonic emitters 50 can be placed on both sides of tank 20.

The agitation means of FIG. 2a-2c can be used individually or together in any combination. Other agitation methods are used in other embodiments.

Figure 3:
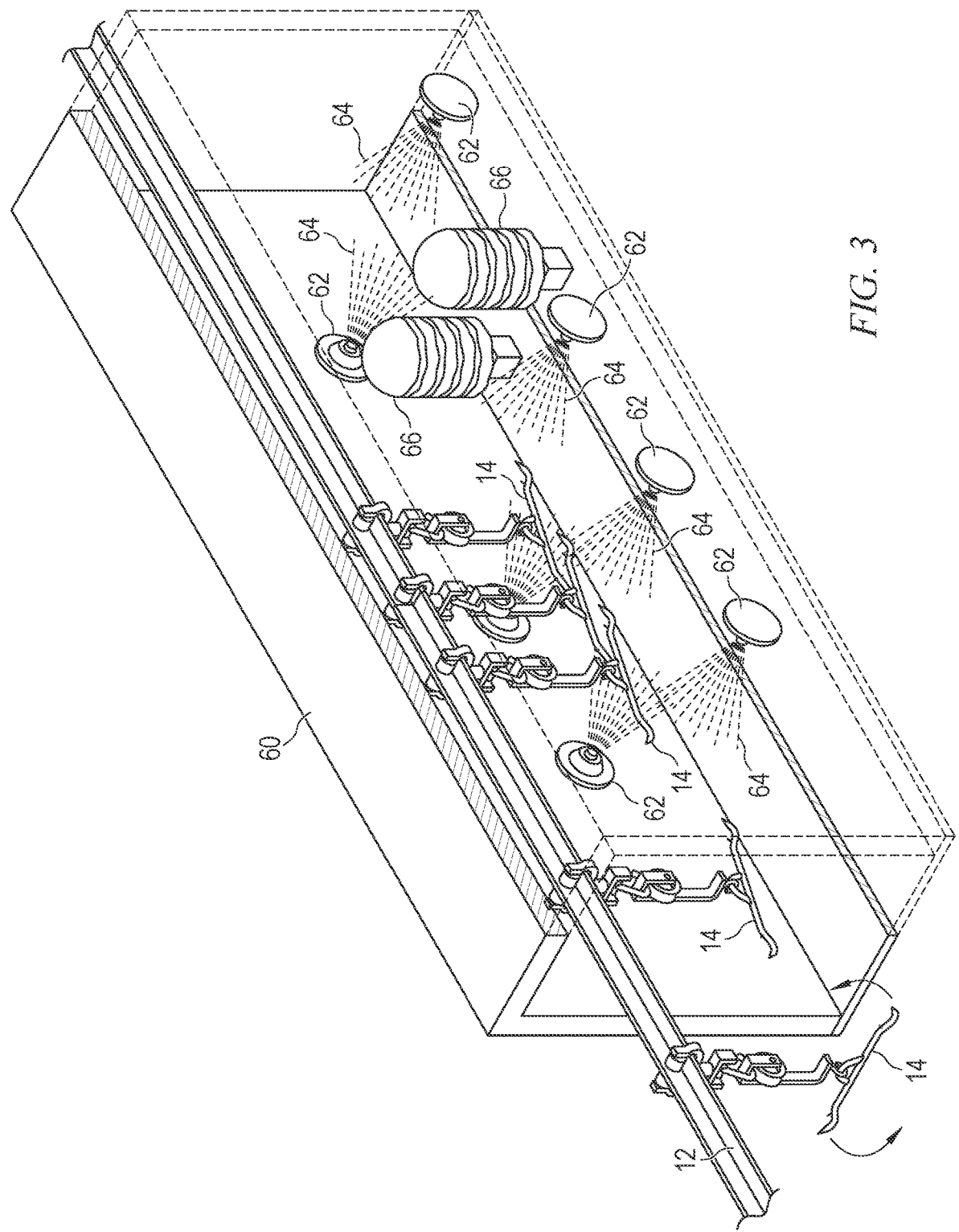
FIG. 3 illustrates a spray cleaning method.

FIG. 3 shows a gambrel washer 60 that cleans gambrels 14 without submersion in cleaning solution 24. Rather than submerse gambrels 14 into tank 20 of cleaning solution 24, the cleaning solution is sprayed onto the gambrels by nozzles 62 generating a stream 64 of cleaning solution. Streams 64 can be applied at varied angles and elevations to provide multiple attack angles for the spray. The force of stream 64 will be sufficient to knock off most particles. Brushes 66 are optionally used as well to provide additional physical contact to remove particles. Ultrasonic emitters can also be used in washer 60. As with tank 20, spray, brushes, and ultrasonics can each be used individually or in any combination in washer 60.

Gambrel washer 60 is a tunnel, similar to a commercial dishwasher, which gambrels 14 are guided through by track 12. In one embodiment, spray nozzles 62 spray on cleaning solution 24 only prior to brushes 66. After brushes 66, nozzles 62 can spray on a lubricant, a sanitizer, or simply use water to rinse off cleaning solution 24. One embodiment has a series of sprayers that first spray on cleaning solution 24 prior to brushes 66, then spray on water to rinse off the cleaning solution, then spray on a sanitizer, then finally a lubricant as the gambrels move through washer 60.

Figure 4A:
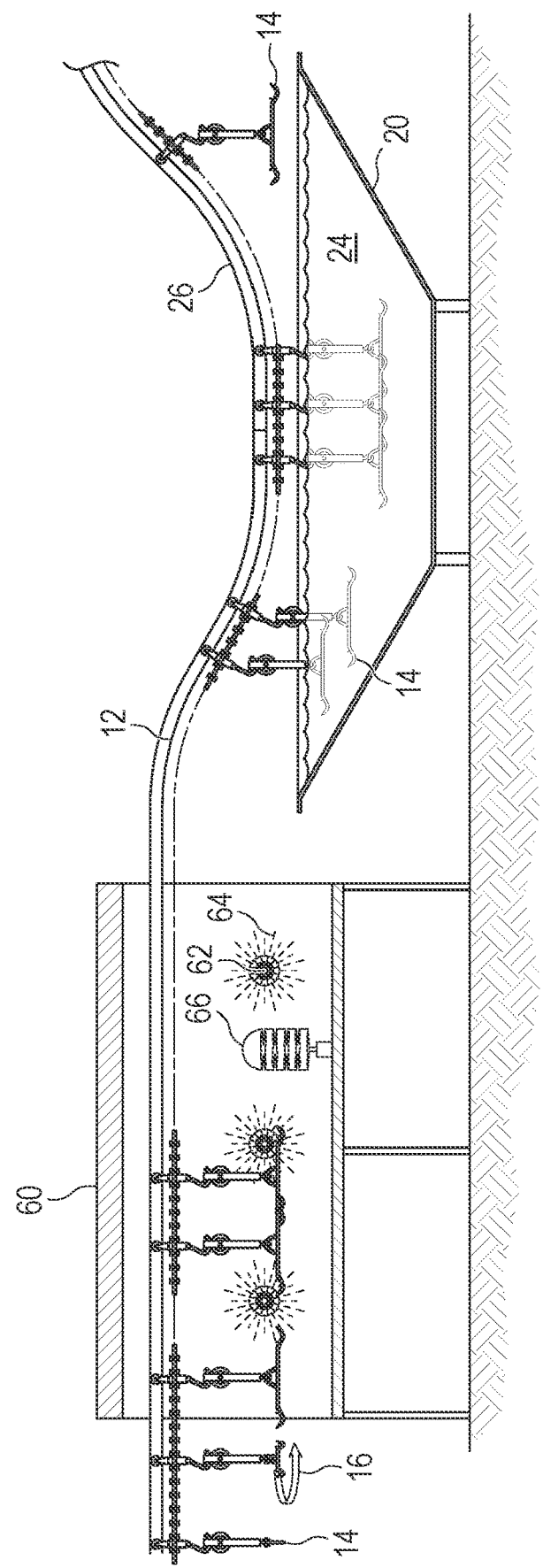
FIGS. 4a and 4b illustrate combination tank and spray methods.

FIG. 4a shows a cleaning system that combines spray washer 60 with submersion tank 20. Track 12 routes gambrels 14 through washer 60 and then tank 20 in series. Nozzles 62 in washer 60 preclean gambrels 14 and prevent larger chunks from reaching tank 20. Washer 60 can be configured so that cleaning solution 24 drains into tank 20 while larger chunks of matter are filtered out. In some embodiments, washer 60 fully cleans gambrels 14 while submersion in tank 20 is used to sanitize, lubricate, rinse, or otherwise post-treat the gambrels. Tank 20 includes jets, brushes, or ultrasonic emitters even when used in conjunction with spray washer 60 in some embodiments. Both spray washer 60 and tank 20 can include ultrasonic emitters.

Figure 4B:
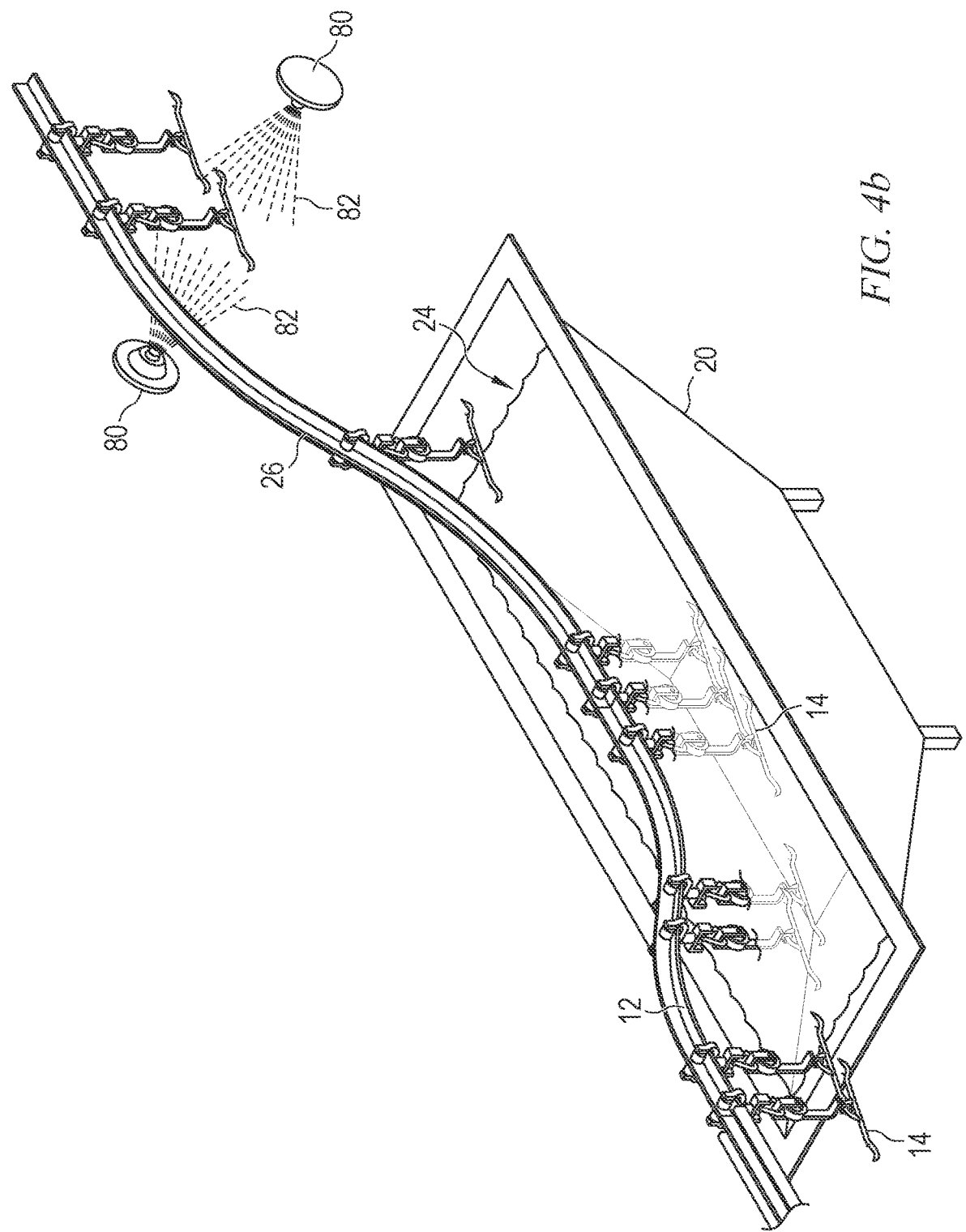

FIG. 4b shows sprayers 80 positioned after tank 20 to apply a sanitizer or lubricant 82. Applying a lubricant as a spray after tank 20 is preferred to mixing the lubricant into cleaning solution 24. A separate lubricant sprayed on after tank 20 allows a wider array of options for the specific lubricant being used. Applying a lubricant as part of cleaning solution 24 requires the lubricant be water soluble, while after-sprayed lubricant can be non-water-soluble, e.g., silicone or fluorinated lubricants. Non-water-soluble lubricants have the advantage that they won't be removed by normal aqueous cleaners and therefore do not need to be applied as often. The non-water-soluble lubricants also act as rust inhibiters, which is a big benefit in embodiments where cast iron parts are used.

Sanitizers can also be sprayed on after tank 20. C-1000 was described in the provisional application, incorporated herein by reference, and is a suitable sanitizer that is direct food contact safe. Any suitable sanitizer can be used in other embodiments, e.g., one based on a quaternary ammonium compound, hydrochloric acid, or hydrogen peroxide.

In another embodiment, a cleaning system includes all three of spray washer 60, tank 20, and after-spray nozzles 80. Spray washer 60 can follow tank 20 in the process with or without after-spray nozzles 80.

Figure 5B:
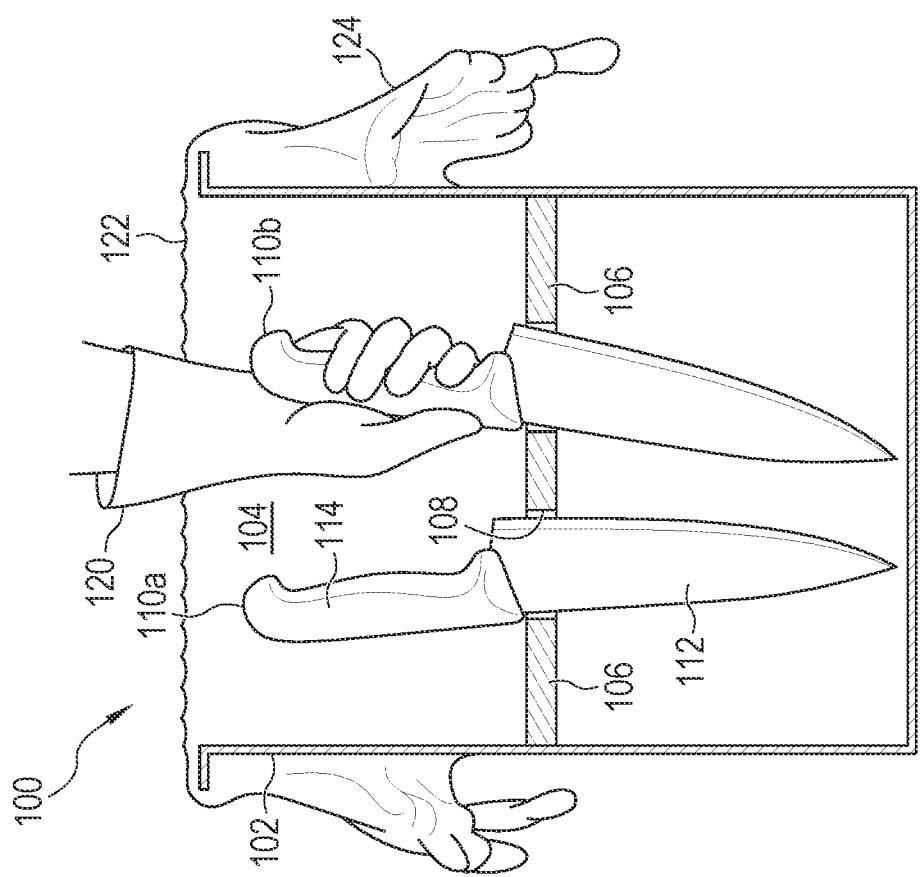
FIGS. 5a and 5b illustrate a knife cleaning tank.
Figure 5A:
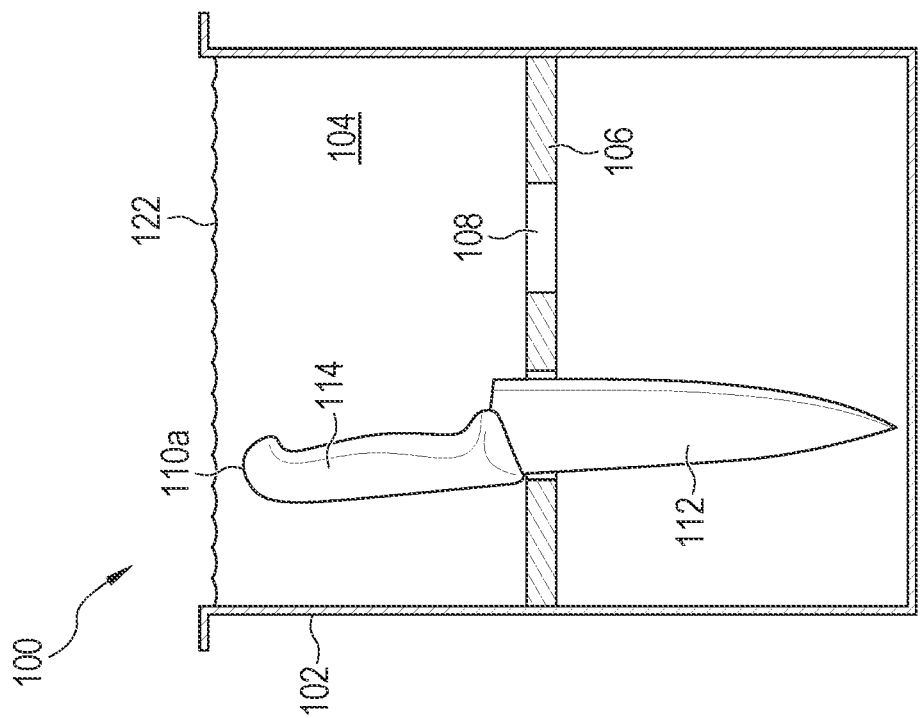

FIGS. 5a and 5b show a knife cleaning tank 100 used by employees processing meat as gambrels 14 go by the workers on the assembly line. Knife cleaning tank 100 includes a vessel 102 filled with cleaning solution 104. Cleaning solution 104 can be the same as or different from cleaning solution 24. A board 106 is installed in vessel 102 and includes two slots 108 for placing knives 110. Board 106 is formed from Teflon, metal, plastic, wood, or another suitable material. In other embodiments, board 106 is a grate without slots 108 and knives 110 are set flat onto the grate for cleaning. Knife cleaning tank 100 may have ultrasonic emitters, water jets, brushes, or other agitation mechanisms, as shown in FIGS. 2a-2c installed within vessel 102 to help aid in cleaning knives 110.

Vessel 102 is filled up with cleaning solution 104 sufficiently to fully cover a knife 110a placed in a slot 108, including both the blade 112 and handle 114 of the knife. In the prior art, plain water heated to 180 degrees Fahrenheit is used, which is only able to be applied to blade 112 and not handle 114 because water at that temperature would make it difficult for the user to pick up knife 110 by the blade. Cleaning solution 104 cleans knives 110 sufficiently without heating to 180 degrees, therefore handle 114 can be cleaned with blade 112.

The user of knife cleaning tank 100 leaves one knife in the tank while the other is being used. After each animal is processed, the knife currently being used, e.g., knife 110b in FIG. 5b, is placed back into an available slot 108 for cleaning. The additional benefit of having cleaning solution 104 filled up above handle 114 is that the user's glove 120 is also dunked into tank 100 and cleaned when the user places or picks up a knife 110. The prior art does not clean gloves 120 as an inherent part of the knife-cleaning process.

Also in the prior art, the 180-degree water for knife cleaning is cycled through at a rate of about 2 gallons per minute to keep the water fresh and clean. Cycling through the water at that rate is a huge waste of water, a huge cost to heat that much water, and also a huge cost to process that much wastewater. Knife cleaning tank 100 cycles through much less water.

The level 122 of cleaning solution 104 is high enough that when the user places his or her hand into tank 100 with glove 120 on, the volume of the user's hand displaces some of the cleaning solution over the edge of vessel 102 as shown by splashes 124. Tank 100 includes an auto-fill system that opens a valve to automatically fill vessel 102 back up to level 122 after the user's hand is removed. Refilling back up to level 122 after each knife exchange utilizes much less water than in the prior art system, as little as an ounce or two each exchange. Splash 124 coming off the top of tank 100 helps remove floating particulates that gather at the top of cleaning fluid 104 in addition to keeping the cleaning fluid fresh. In addition, periodically draining a percentage of cleaning solution 104 from the bottom of tank 100 may be desired to remove particulates that collect at the bottom of the tank. In one embodiment, 10% of cleaning solution 104 is drained from the bottom of vessel 102 every 15 minutes.

After knife 110b is placed in FIG. 5b, the other knife 110a is picked up for processing of the next animal on another gambrel 14. Knife 110b is being cleaned while knife 110a is used. The user continually swaps back and forth between knife 110a and knife 110b each time another animal is processed on gambrels 14. Tank 100 ensures that knife 110 and glove 120 both remain clean.

As part of the overall cleaning process, an environmentally friendly all-purpose cleaner can be used to clean the floor and other surfaces of the processing plant. One suitable all-purpose cleaner is SuperGreen, which is described in the provisional application incorporated herein by reference. The floor or surface can be sanitized with a disinfectant after cleaning.

Figure 6C:
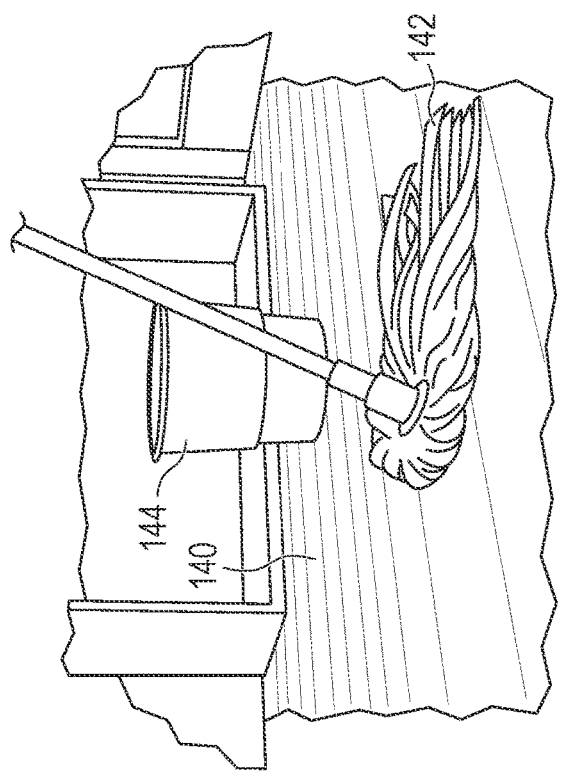
FIGS. 6a-6c illustrate additional cleaning methods.
Figure 6A:
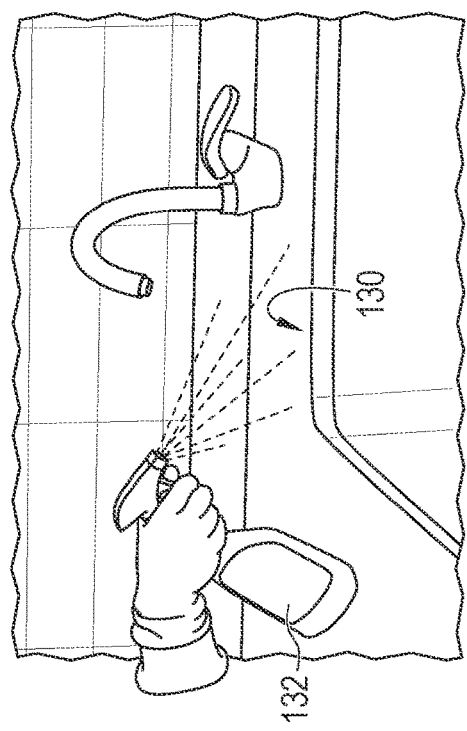

FIG. 6a shows cleaning a surface 130 by spraying an environmentally friendly all-purpose cleaner 132 onto the surface. Any surface within a meat packing or food processing plant can be cleaned with cleaner 132, e.g., floors, walls, cutting tables, equipment, slicers, machine parts, etc. In the prior art, meat packing plant surfaces are cleaned with the same caustic soda and bleach solution used to clean gambrels 14. Switching to an environmentally friendly all-purpose cleaner is safer and easier on wastewater management. Switching to a cleaner without sodium makes processing the wastewater cheaper by eliminating the expensive process of removing sodium.

Figure 6B:
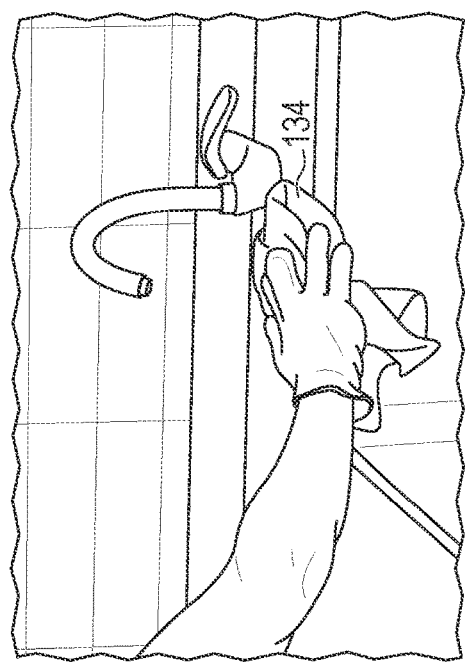

A plant-based cleaner 132 can be used to generate carbon credits or offsets because it's a renewable resource. A sanitizer can be applied after cleaning with cleaner 132, e.g., C-1000, quat-based, or hydrogen peroxide. Cleaner 132, the sanitizer, or both can be rinsed off with water if desired. There is no need to rinse off C-1000 or other sanitizers approved for direct food contact. FIG. 6b shows mopping floor 140 with a mop 142 and cleaning solution 144. The same environmentally friendly all-purpose cleaner 132 used as a spray can also be used to mop. Floor 140 can be rinsed after washing with cleaning solution 144 if desired. A sanitizer can be applied after washing with cleaning solution 144 if desired.

While one or more embodiments of the present invention have been illustrated in detail, the skilled artisan will appreciate that modifications and adaptations to those embodiments may be made without departing from the scope of the present invention.

What is claimed:

1. A method of cleaning in a meat-packing plant, comprising:
    providing a tank;
    disposing a cleaning solution comprising a potassium-based non-caustic cleaner and a lubricant in the tank, wherein the potassium-based non-caustic cleaner is provided as a concentrate with a pH of between 10.0 and 10.2, wherein the lubricant includes polypropylene glycol, and wherein the cleaning solution in the tank is at room temperature;
    providing a track including a gambrel disposed on the track, wherein the track is configured to dip the gambrel into the cleaning solution as the gambrel moves along the track, wherein a hook of the gambrel is fully immersed in the cleaning solution and the track never extends into the cleaning solution, and wherein the cleaning solution cleans and lubricates the gambrel;
    removing a processed animal carcass from the gambrel prior to the gambrel being dipped into the cleaning solution;
    turning the gambrel a first time prior to the gambrel being dipped into the cleaning solution, wherein turning the gambrel the first time orients the gambrel parallel to the track;
    dipping the gambrel into the cleaning solution by advancing the gambrel on the track, wherein the cleaning solution in the tank remains at room temperature and the gambrel remains oriented parallel to the track;
    removing the gambrel from the cleaning solution by continuing to advance the gambrel on the track;
    turning the gambrel a second time after removing the gambrel from the cleaning solution, wherein turning the gambrel the second time orients the gambrel perpendicular to the track; and
    disposing a fresh animal carcass on the gambrel after the gambrel is dipped into the potassium-based non-caustic cleaner.

2. The method of claim 1, further including spraying a sanitizer on the gambrel after the gambrel is dipped into the cleaning solution.

3. The method of claim 1, further including disposing a brush in the tank.

4. The method of claim 1, further including disposing a jet in the tank, wherein the jet is oriented directly at the hook of the gambrel.

5. The method of claim 1, further including disposing an ultrasonic emitter in the tank, wherein only a single ultrasonic emitter is disposed in the tank, and wherein ultrasonic sound waves emitted by the ultrasonic emitter echo off of an opposing surface of the tank to further clean the gambrel.

6. The method of claim 1, further including disposing of the cleaning solution by using the cleaning solution to irrigate crops, wherein the potassium-based non-caustic cleaner acts as a fertilizer.

* * * * *